United States Patent [19]

Hiraishi

[11] Patent Number: 4,494,673
[45] Date of Patent: Jan. 22, 1985

[54] SAFETY PLASTIC FILLER NECK CAP
[75] Inventor: Hideki Hiraishi, Okayama, Japan
[73] Assignee: O M Industrial Co., Ltd., Okayama, Japan
[21] Appl. No.: 577,668
[22] Filed: Feb. 7, 1984
[30] Foreign Application Priority Data
  May 4, 1983 [JP] Japan .................. 58-78751
[51] Int. Cl.³ .............................................. B65D 41/04
[52] U.S. Cl. ..................... 220/288; 220/303; 220/304; 220/DIG. 33
[58] Field of Search ........ 220/288, 303, 304, DIG. 33
[56] References Cited
U.S. PATENT DOCUMENTS

| 4,177,931 | 12/1979 | Evans | 220/288 |
| 4,228,915 | 10/1980 | Hooper et al. | 220/304 |
| 4,337,873 | 7/1982 | Johnson | 220/303 |
| 4,458,823 | 7/1984 | Baker | 220/288 |
| 4,458,824 | 7/1984 | Baker et al. | 220/288 |

Primary Examiner—George T. Hall
Attorney, Agent, or Firm—Koda and Androlia

[57] ABSTRACT

A safety plastic filler neck for an automobile, vehicle, etc., that functions both to control the screwing torque and to prevent the fuel leakage from filler port through releasing a cap separable from the screw body. The screw body includes a flange disposed on its top portion, engaging/disengaging teeth formed at several locations along its outer circumference by extending the flange, a circular standing edge provided on the flange, latching teeth formed at several locations along the outer circumference of the circular standing edge which are to be latched in screwing direction, and incisions provided under the latching teeth and corresponding to them. The cap includes a rotation flange disposed on top of it, a round cover edge for covering the circular standing edge and the engaging/disengaging teeth of the screw body, latches formed on upper inner surface of the round cover edge, and an anchoring groove formed in lower inner surface of the round cover edge. When the cap is engaged with the screw body, the engagement is effected between the latching teeth and the latches and between the engaging/disengaging teeth and the anchoring groove, respectively. In this way, the cap and the screw body are combined into a single unit.

1 Claim, 6 Drawing Figures

SAFETY PLASTIC FILLER NECK CAP

BACKGROUND OF THE INVENTION

1. Field of the Invention

The present invention relates to a safety plastic filler neck cap for an automobile, etc., and particularly to a screwed type filler neck cap that is developed for the purpose of providing a safety plastic filler neck cap capable of performing two functions. That is, to control the torque balance in screwing and to prevent fuel leakage from the filler neck port caused by the separation of the cap upon receiving an impact.

2. Description of the Prior Art

Fuel filler neck ports for automobiles, etc. which use latches and latching teeth for screwing torque (balance) control have been known widely. Conventionally, various types of structures have been provided for those filler neck port caps. However, many of such structural designs proposed are complicated, thus inviting a high cost for the filler neck caps with these structures. Furthermore, the fuel filler neck caps capable of preventing the leakage of gasoline from the filler neck ports have been proposed by, for example, U.S. Pat. No. 4,177,931. The mechanism used for preventing the fuel leakage in the foregoing filler neck caps is to keep the screw body itself intact from damage while only the upper portion of the screw body is left to be broken together with the filler neck cap cover upon receiving an impact. However, these are not satisfactory in structure as they are not reusable after being damaged. Up to now, it seems that the fuel filler neck caps provided with a structure allowing the cap cover alone to come off the screwing body portion of the cap have not been offered as yet.

SUMMARY OF THE INVENTION

The present invention was achieved as the result of various studies conducted with the present conditions of the filler neck caps as described above in mind. Therefore, the object of the present invention is to provide a screwed type safety filler neck cap with the combined functions of controlling the screwing torque and of preventing fuel leakage from the filler neck port due to separation of the cap cover under impact.

The present invention implements the aforesaid object in the followng manner. The safety filler neck cap is composed broadly of a screw body and a cap. The screw body has the screwing portion fitting with the screw pitch of the fuel feeder neck port of an automobile, etc. The cap can be engaged with as well as disengaged from the screw body. The screw body includes a flange, engaging/disengaging teeth, a circular standing (vertical) edge, latching teeth, and notches. The flange is disposed in the upper portion of the screw body. The engaging/disengaging teeth are formed at several locations along the outer circumference of the flange by extending the flange at positions corresponding to the above. The circular standing edge is provided on the upper surface of the flange. The latching teeth are formed at several locations along the outer circumference of the circular standing edge and they are to be hooked in the screwing direction. The notches are provided underneath the latching teeth by incising the portions corresponding to the positions of the latching teeth. On the other hand, the cap is provided with a rotation flange (a ridge for rotating the cap), a round cover edge, latches, and an anchoring groove. The rotation flange is disposed on a top surface of the cap. The round cover edge covers the circular standing edge and the engaging/disengaging teeth of the screw body. The latches are provided at the upper portion of the inner surface of the round cover edge. The anchoring groove is formed in the lower portion along the inner surface of the round cover edge. When the cap is engaged with the screw body, the latching teeth are engaged with the latches, while the engaging/disengaging teeth come to be engaged with the anchoring groove, respectively. In this way, the cap and the screw body become combined into forming a single unit.

BRIEF DESCRIPTION OF THE DRAWINGS

The above mentioned features and objects of the present invention will become apparent from the following description taken in conjunction with the accompanying drawings in which like reference numerals denote like elements and in which:

FIG. 5 and FIG. 6 show a modified embodiment, wherein FIG. 5 is a partially cutaway plan view of the cap portion and FIG. 6 is a sectional view taken along the line B—B in FIG. 5.

DETAILED DESCRIPTION OF THE INVENTION

A detailed description will hereunder be given of the embodiments of the present invention with reference to the drawings.

Figure 2:
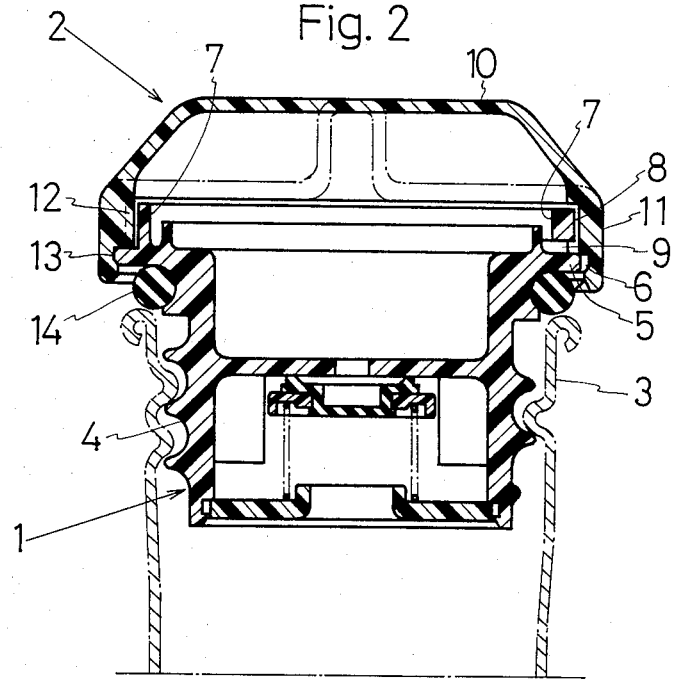
FIG. 2 is a sectional view taken along the line A—A in FIG. 1.

The safety plastic filler neck cap provided in accordance with the present invention is a screwed type. As shown in FIG. 2, it includes a screw body 1 and a cap 2. The screw body 1 is the same as that provided by the prior art in that it has a screw portion 4 that matches with the screw pitch of a fuel feeder neck pipe 3; however, the screw body 1 provided by the present invention has the structural assemblies on its top. One of these structural assemblies is the one that is capable of engaging with and disengaging from the cap 2. Another one of them is that serving to control the torque driving screwing.

Figure 3:
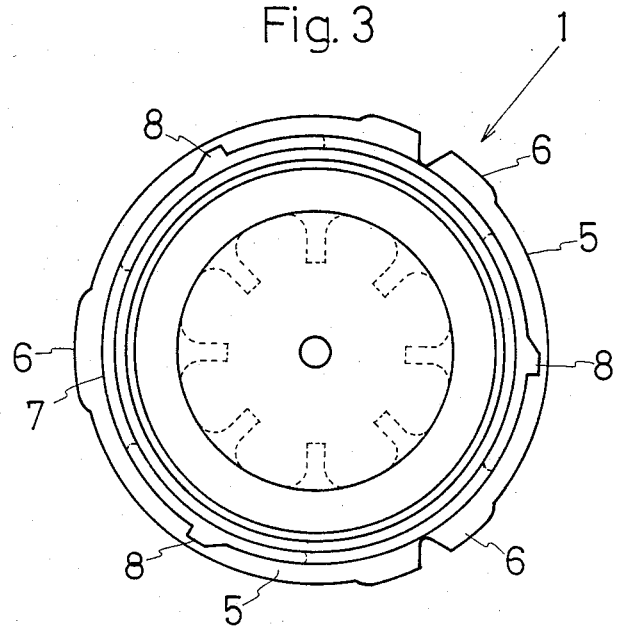
FIG. 3 is a plan view of a screw body.
Figure 4:
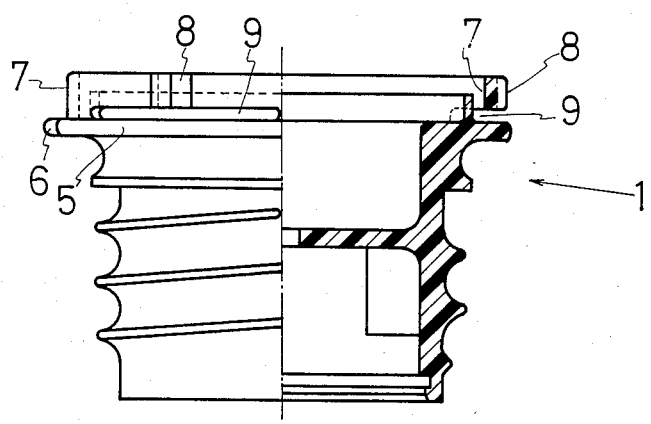
FIG. 4 is a partially cutaway side view of the screw body.

That is, as shown in FIG. 3 and FIG. 4, in the screw body 1, the structural assembly for engaging/disengaging it with and/or from the cap 2 includes a falnge 5 and engaging/disengaging teeth 6 which are formed by extending the flange 5 at several positions along its outer circumference. The structural assembly for performing the torque control includes a circular standing edge 7, latching teeth 9, and incisions 9. The circular standing edge 7 is formed on top of the flange 5. The latching teeth 8 are formed at several locations along the outer circumference of the circular standing edge 7, and they are latched in the screwing direction. The incisions 9 are provided beneath the latching teeth 8. In the Figures, the latching teeth 8 are provided at three locations.

Figure 1:
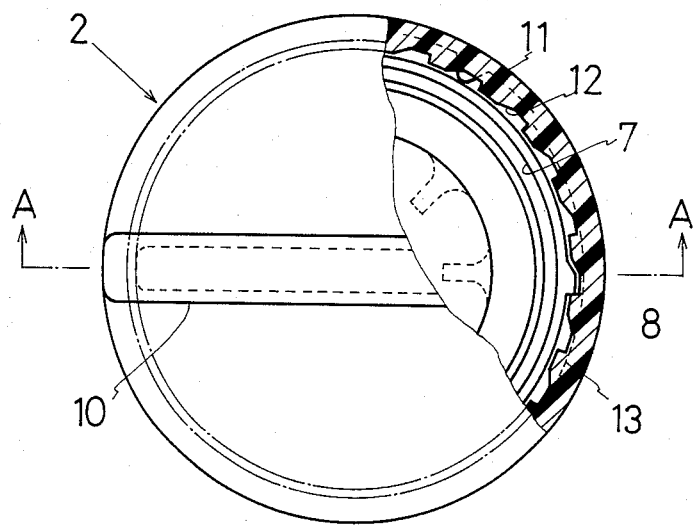
FIG. 1 is a partially cutaway plan view of the cap portion.

On the other hand, in the cap 2, as shown in FIG. 1 and FIG. 2, a rotation flange 10 and a round cover edge 11 are included. The rotation flange 10 is disposed on the upper surface of the cap 2. The round cover edge 11 covers the circular standing edge 7 as well as the engaging/disengaging teeth 6 of the screw body 1. As the structural assembly having the mechanism for engaging with and disengaging from the screw body 1, an anchoring and releasing groove 13 is formed along a whole circumference at the lower portion of the inner surface of the round cover edge 11 at the level corresponding to the positions of the engaging/disengaging teeth 6 of the screw body 1. As the structural assembly for controlling the screwing torque, laches 12 are provided along a whole circumfrence over the inner surface in the upper portion of the round cover edge 11 at the height corresponding to the positions of the latching teeth 8 provided in the screw body 1.

Accordingly, merely by pressing the cap 2 from above while placing it over the top surface of the screw body 1, the engaging/disengaging teeth 6 formed along the outer circumference of the flange of the screw body fit with the anchoring groove 13 provided in the lower portion of the inner surface of the cap; while at the same time, the latching teeth 7 of the screw body are brought into engagement with the latches 12 provided in the upper portion of the inner surface of the cap. In this manner, the screw body 1 and the cap 2 are coupled into a single unit of a safety filler neck cap.

Figure 5:
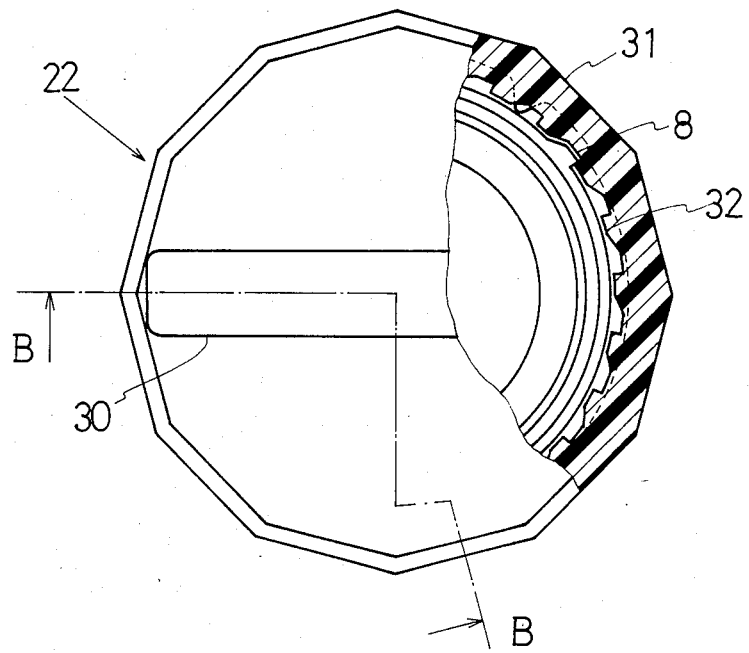
Figure 6:
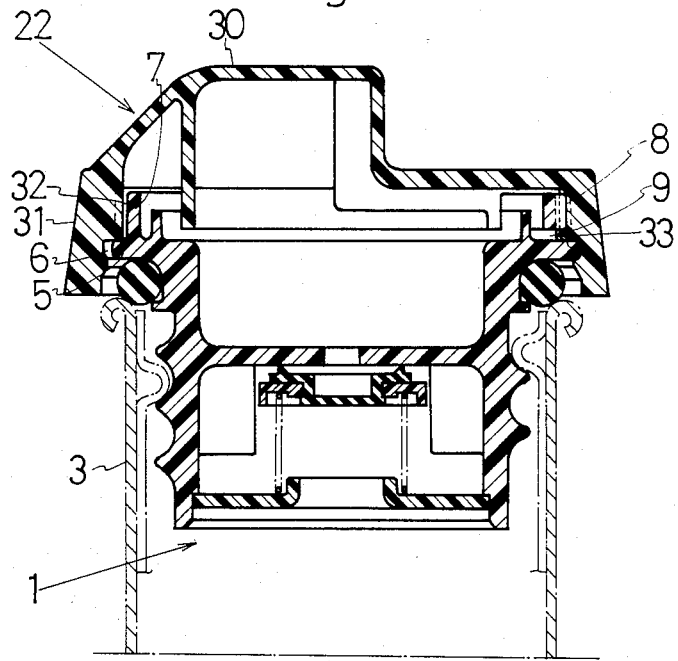

FIG. 5 and FIG. 6 show a modified embodiment of the filler neck cap in accordance with the present invention. This embodiment is totally identical with that described previously in its function, except that it is slightly different from the former in its shape. The modified points are only those mentioned below. That is, in shape, in order to facilitate the manual rotation of the cap 22 and in addition to providing the rotation flange 30, the cover edge is formed into a dodecagonal cover edge 31. Also, the angular cover edge 31 of the cap 22 is deepened, and the position of the anchoring groove 33 in the lower portion along the inner surface is raised so that the strength is improved.

In other words, the screw body 1 is not absolutely different from that shown in FIG. 3. That is, it includes the following members: A flange 5, engaging/disengaging teeth 6 formed by extending the flange outwardly at three spots along the outer circumference of the flange 5; a circular standing edge 7 provided on the flange; latching teeth 8 formed at three locations along the outer circumference of the circular standing edge 7; and cuts 9 formed underneath the latching teeth 8 in order to give resiliency to those latching teeth 8 to thereby cause them to retreat toward the center.

The cap 22 as the coupling counterpart of the screw body 1 is provided with the following components: A rotation flange 30 disposed on the upper surface of the cap 22; a deep and dodecagonal cover edge 31 for covering the circular standing edge 7 as well as the engaging/disengaging teeth 6 of the screw body 1; latches 32 formed in the upper portion of the inner surface of the foregoing angular cover edge 31; and an anchoring groove 33 formed in the lower portion of the inner surface of the angular cover edge 31.

As shown in FIG. 6, when the cap 22 is forcibly pressed down to the screw body 1 from above, the latching teeth 8 are engaged with the latches 32, while the engaging/disengaging teeth 6 fit into the anchoring groove 33, respectively, thereby effecting the combination of the screw body 1 and the cap 22 into a single unit.

When the fuel filler neck cap having the above mentioned structure is turned in the direction to screw it into the fuel feeder pipe as shown in FIG. 2 or FIG. 6, the latches 12 of the cap come to be latched with the latching teeth 8 of the screw body, and the cap is rotated together with the screw body. In this way, the cap and the screw body are screwed into the fuel feeder neck pipe. Then, when the edge of the fuel feeder neck pipe 3 comes into contact with the O-ring packing 14 and the torque is applied to the latching teeth 8, the latching teeth 8 disengage from the latches by moving outwardly due to the cuts 9 provided underneath. This in turn causes the cap 2 alone to rotate idly, resulting in that the screw body 1 is clamped with a given torque, thereby sealing the fuel feeder neck pipe 3.

In this state, if an impact is applied to the cap, the engaging/disengaging teeth 6 of the screw body are released from the anchoring groove 13 of the cap, allowing only the cap to be loosened from the screw body. In consequence, the screw body is kept from getting damaged, and the fuel leakage from the fuel feeder pipe 3 is prevented.

As should be apparent from the detailed description given above, a highly safe product is provided by the present invention, in spite of the simple structure of the safety plastic filler neck cap according to the teachings of this invention, as it is designed to be capable of controlling not only the screwing torque, but also of releasing the cap portion without causing it to be damaged when coming under impact.

I claim:

1. A safety plastic filler neck cap for vehicle comprising:
   a screw body having a screw portion fitting with a screw pitch of a fuel feeder neck pipe of the vehicle comprising:
      a flange disposed on the top of the screw portion;
      engaging/disengaging teeth formed by extending the flange at several positions along its outer circumference;
      a circular standing edge provided on the flange;
      latching teeth formed at several locations along an outer circumference of the circular standing edge, which are to be latched in a reverse screwing direction; and
      cuts corresponding to the latching teeth, which are formed underneath the latching teeth; and
   a cap capable of engaging with and disengaging from the screw body comprising:
      a rotation flange disposed on top of the cap;
      a round cover edge for covering the circular standing edge as well as the engaging/disengaging teeth of the screw body;
      latches provided at an upper portion of an inner surface of the round cover edge; and
      an anchoring groove formed in a lower portion of the inner surface of the round cover edge;
   whereby when the cap is engaged with the screw body, the latching teeth are caused to be engaged with the latches, while at the same time, the engaging/disengaging teeth fit in the anchoring groove, respectively, thereby effecting the combination of the cap and the screw body into a single unit.

* * * * *